US010355721B2

United States Patent
Völkel et al.

(10) Patent No.: US 10,355,721 B2
(45) Date of Patent: Jul. 16, 2019

(54) MULTI-BAND RADIO FREQUENCY TRANSPARENCY WINDOW IN CONDUCTIVE FILM

(71) Applicant: Palo Alto Research Center Incorporated, Palo Alto, CA (US)

(72) Inventors: Armin R. Völkel, Mountain View, CA (US); George Daniel, Mountain View, CA (US); Bernard D. Casse, Saratoga, CA (US); Christopher Lalau-Keraly, San Francisco, CA (US)

(73) Assignees: PALO ALTO RESEARCH CENTER INCORPORATED, Palo Alto, CA (US); AGC AUTOMOTIVE AMERICAS R&D, INC., Ypsilanti, MI (US)

( * ) Notice: Subject to any disclaimer, the term of this patent is extended or adjusted under 35 U.S.C. 154(b) by 25 days.

(21) Appl. No.: 15/583,336

(22) Filed: May 1, 2017

(65) Prior Publication Data
US 2018/0316365 A1 Nov. 1, 2018

(51) Int. Cl.
| | | |
|---|---|---|
| B32B 3/00 | (2006.01) |
| H04B 1/00 | (2006.01) |
| H01B 5/14 | (2006.01) |
| H01Q 1/12 | (2006.01) |
| H01Q 1/32 | (2006.01) |
| H01Q 15/00 | (2006.01) |

(52) U.S. Cl.
CPC ............. *H04B 1/005* (2013.01); *H01B 5/14* (2013.01); *H01Q 1/1271* (2013.01); *H01Q 1/32* (2013.01); *H01Q 15/0013* (2013.01)

(58) Field of Classification Search
CPC .................................. H01B 1/005; H01B 5/14
See application file for complete search history.

(56) References Cited

U.S. PATENT DOCUMENTS

| | | | | |
|---|---|---|---|---|
| 2003/0080909 A1* | 5/2003 | Voeltzel | ............ | B32B 17/10174 343/713 |
| 2003/0112190 A1* | 6/2003 | Baliarda | .............. | H01Q 1/1271 343/713 |
| 2015/0229030 A1* | 8/2015 | Dai | .................... | H01Q 15/0013 219/203 |

* cited by examiner

Primary Examiner — Elizabeth E Mulvaney
(74) Attorney, Agent, or Firm — Shun Yao; Park, Vaughan, Fleming & Dowler LLP

(57) ABSTRACT

An apparatus with structures in a conductive film that let a selected set of RF frequency bands pass through, while blocking the passage of all other frequencies is disclosed. The film may include a first portion of the film and a second portion of the film circumscribing the first portion. The second portion is separated from the first portion by a first gap along a periphery of the first portion of the film and wherein a width of the first gap is associated with a wavelength of a first radio signal.

20 Claims, 12 Drawing Sheets

MULTI-BAND RADIO FREQUENCY TRANSPARENCY WINDOW IN CONDUCTIVE FILM

BACKGROUND

A variety of vehicles, such as automobiles and aircraft, carry radio equipment to send or receive signals with other devices. To communicate with the other devices, the radio equipment includes antennas inside the vehicles that are used to send and receive the signals. The vehicles may include objects that interfere with the radio device sending and receiving the signals.

BRIEF DESCRIPTION OF THE DRAWINGS

The present disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

In the following description, various aspects of the illustrative implementations will be described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials, and configurations are set forth in order to provide a thorough understanding of the illustrative implementations. However, it will be apparent to one skilled in the art that the present disclosure may be practiced without the specific details. In other instances, well-known features are omitted or simplified in order not to obscure the illustrative implementations.

Conductive films are used in many instances to separate one side of a surface from another for protective, safety, functional, or aesthetic reasons, e.g. the interior of a vehicle or building may be protected from incoming IR light through a multilayered metal-dielectric film. Conventionally, the multilayered metal-dielectric material may absorb or block communication signals from being transmitted across the conductive film. The conductive film may render radio devices on one side of the film unable to communicate with devices on the other side of the conductive film.

The present disclosure addresses the above-mentioned and other deficiencies by providing for RF gaps in the film that allow radio frequency (RF) signals at select frequencies to be transmitted across the film in either direction. The film may be a support layer of material located between sheets of glass. For example, the glass may be laminated with multiple layers of glass. Sections of the conductive film may be removed to split up or separate the film and allow the sending and the receiving of signals across the film.

Figure 1A:
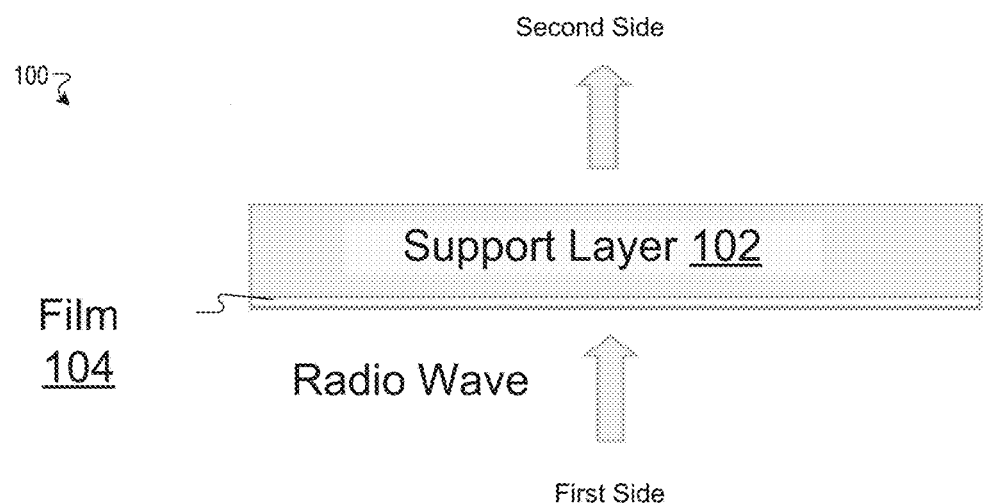
FIG. 1A illustrates a structure that includes a support layer and a film according to an implementation.

FIG. 1A illustrates a transparent structure 100 that includes a support layer 102 and a film 104 according to an implementation. The conductive film 104 may be either self-supporting or fabricated or laminated onto the support layer 102 and may include a single conductive layer or of a multilayer structure with alternating conductive and non-conductive layers.

As discussed below, the film 104 includes one or more RF gaps that allow the plane wave or radio signal to be transmitted across the film. In one implementation, a radio signal at a frequency f1 may be transmitted from a device towards the structure 100. This radio signal may pass through film 104 if f1 lies within the one or more RF gaps of the film and the radio signal may be reflected when f1 lies outside the one or more RF gaps of the film. When a signal is transmitted across the film, the signal may pass from the first side of the film 104 to the second side of the film, as discussed below.

In one implementation, the supportive layer 102 may be optional. The support structure consists of a non-conducting material that is transparent in the RF frequency range. The support layer 102 may be a layer of a glass material, plastic material, polymethyl methacrylate material (such as Plexiglass™), an acrylic material, and so forth. In one implementation, the transparent structure 100 may be a window of a vehicle, such as a car, a truck, a bus, a train, and so forth. For example, the support layer 102 may be a layer of glass used in a windshield, a backlight, a side window, a skylight, or another window of a vehicle. In another implementation, the transparent structure 100 may be a window in an office building or a house. In another implementation, the transparent structure 100 may be a window in an aircraft, such as an airplane or helicopter. In another implementation, the transparent structure 100 may be a visor in a helmet.

The support layer 102 can enable an individual to see through the support layer 102 from a first side of the support layer 102 to a second side of the support layer 102. For example, the support layer 102 may be part of a windshield of a car that enables a driver to see from an inside of the car to an outside of the car.

The film 104 may be a layer of material that may be applied to the support layer 102. In one implementation, the film 104 may be made of metal material, metal alloy material, ceramic material, or dielectric material that is an infrared barrier for at least a portion of infrared light or other spectrum of light. In another implementation, the film 104 may be a conductive material that is an infrared barrier. In another implementation, the film 104 may a support layer or substrate impregnated with indium, tin oxides, noble metals, and so forth.

The film 104 may block at least a first portion of the light spectrum, such as infrared light, from traveling from a first side of the transparent structure 100 to a second side of the transparent structure 100. For example, the film 104 may reduce an amount of infrared light in sunlight that enters an interior of a car by reflecting the infrared light. The film 104 may also allow a second portion of the light spectrum, such as visible light, to pass through the film. The film 104 may be substantially transparent.

In one implementation, the film 104 may be a coating that may be applied to the support layer 102. For example, the film 104 may be a metallic coating that may be sprayed onto the support layer 102. For example, the film 104 may be an IR reflective coating that is sputtered onto the support layer 102. In another implementation, the film 104 may be a strip of material that may be applied to the support layer 102. For example, one side of the film 104 may include an adhesive that may be stuck or laminated to the support layer 102. The side of the support layer 102 that the film 104 is applied to is not intended to be limiting. For example, the film 104 may be applied to the first side of the support layer 102 or the second side of the support layer 102.

In one implementation, a radio signal may be transmitted from a device towards the transparent structure 100. The film 104 may interfere or block a radio signal from passing through the transparent structure 100. For example, the film 104 may be a coating that reflects IR energy to reduce an amount of IR energy would enter the car and increase an internal temperature of the car.

The conductive parts of the material that reflect the IR energy may interfere with devices within the vehicle sending RF signals to devices outside the vehicle. The film 104 may include one or more gaps that allow the plane wave or radio signal to be transmitted across the film. The gap may be an RF gap to allow RF signals to be transmitted across the gap. When a signal is transmitted across the film, the signal may pass from the first side of the film 104 to the second side of the film, as discussed below.

Figure 1B:
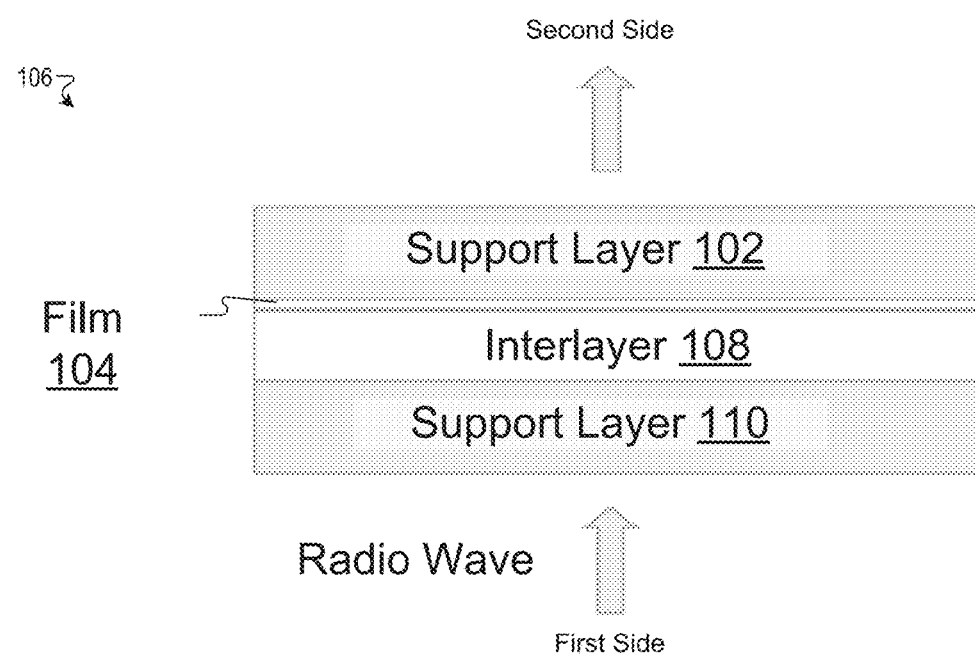
FIG. 1B illustrates a structure that includes a first support layer, a film, an interlayer, and a second support layer, according to an implementation.

FIG. 1B illustrates a transparent structure 106 that includes a first support layer 102, a film 104, an interlayer 108, and a second support layer 110, according to an implementation. Some of the features in FIG. 1B are the same or similar to the some of the features in FIG. 1A as noted by same reference numbers, unless expressly described otherwise.

The transparent structure 106 may be a laminated structure. For example, the transparent structure 100 may be laminated glass, such as safety glass, used in an automobile, aircraft, or skyscraper that holds together when it shatters. For example, in the event that the first support layer 102 breaks, the first support layer 102 is held in place by the interlayer 108. The interlayer 108 may be a polyvinyl butyral (PVB) material or an ethylene-vinyl acetate (EVA) material that is located between the first support layer 102 and the second support layer 110. The interlayer 108 keeps the first support layer 102 and the second support layer 110 bonded together even when the first support layer 102 and/or the second support layer 110 is broken. The interlayer 108 may prevent the first support layer 102 and/or the second support layer 110 from breaking up into large sharp pieces of material that may become a hazard.

The transparent structure 106 may also include the film 104. The film 104 may be applied to the first support layer 102, the interlayer 108, or the second support layer 110. The layer that the film 104 is applied to is not intended to be limiting. For example, the film 104 may be applied to either side of the first support layer 102, the interlayer 108, or the second support layer 110 to block IR energy from passing through the transparent structure 106. The film 104 may include one or more gaps that allow the plane wave or the radio signal to pass from a first side of the film 104 to a second side of the film and to communicate with the other devices, as discussed below.

In one implementation, the first support layer 102 may be 2.1 mm thick, the film 104 may be 42 nm thick, the interlayer 108 may be 0.76 mm thick, and the second support layer 110 may be 2.1 mm thick. In another implementation, a loss tangent of the first support layer 102 may be 0.01, a loss tangent of the second support layer 110 may be 0.01, and a loss tangent of interlayer 108 may be 0.05. In another implementation, a dielectric constant of the first support layer 102 may be 7, a dielectric constant of the second support layer 110 may be 7, and a dielectric constant of the interlayer 108 may be 3.

Figure 2:
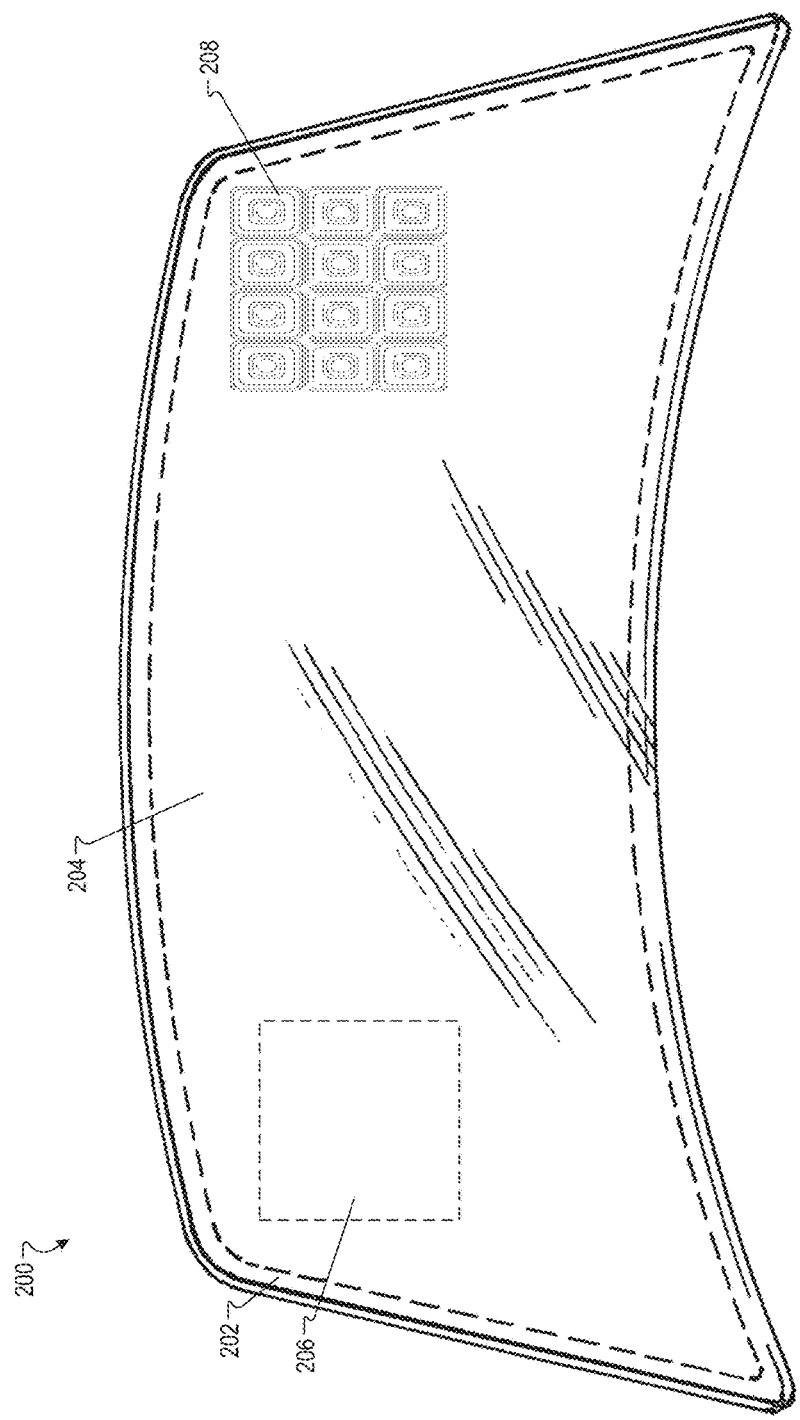
FIG. 2 illustrates a window that includes a support layer and a film, according to one implementation.

FIG. 2 illustrates a window 200 that includes a transparent support layer 202 and a film 204, according to one implementation. The film 204 may be an IR barrier that may be applied on an interior side or an exterior side of the support layer 202. The transparent support layer 202 may include a gap 206 where a portion of the film 204 has been removed. In one implementation, the window 200 may include a gap 206 where the film 204 may not be applied or may be removed. The gap 206 may be a non-conducting gap. Signals may be transmitted across the gap 206. For example, the film 204 may not be applied to the gap 206, to provide a space in the film 204 where a transmission across single frequency, multiple frequencies, or a transmission spectrum may be transmitted across the window 200. In one implementation, the RF signals may be transmitted across this opening in the film 204 where the wavelength of the signal does not exceed 2 times the linear size of the opening to avoid of losing the IR reflectivity of the film over the whole area.

In another implementation, the transparent support layer 202 may include an area 208 where the film 204 may be partially removed from the support layer 202 to provide a partial IR barrier that allows signals at select RF frequencies to be transmitted across the window 200. For example, a portion of the film 204 at the area 208 may be removed to form a single unit cell structure or an array of unit cell structures. The unit cell structure may form an RF gap, which allows the transmission of one or more select RF frequency ranges while blocking signals at other wavelengths from being transmitted across the film 204.

The unit cell structures may be metamaterial (MM) with defined shapes and sizes that interact with signals to block the signal or allow transmission of the signal across the film 104. For example, the gaps may interact with signals to form resonant structures that are frequency selective. The frequency selective structures may cover a wide band of frequencies or a narrow band of frequencies. The unit cell structures may limit an amount of induced current that flow from a signal at a defined frequency to enable the signal to be transmitted across the film 104.

Figure 3A:
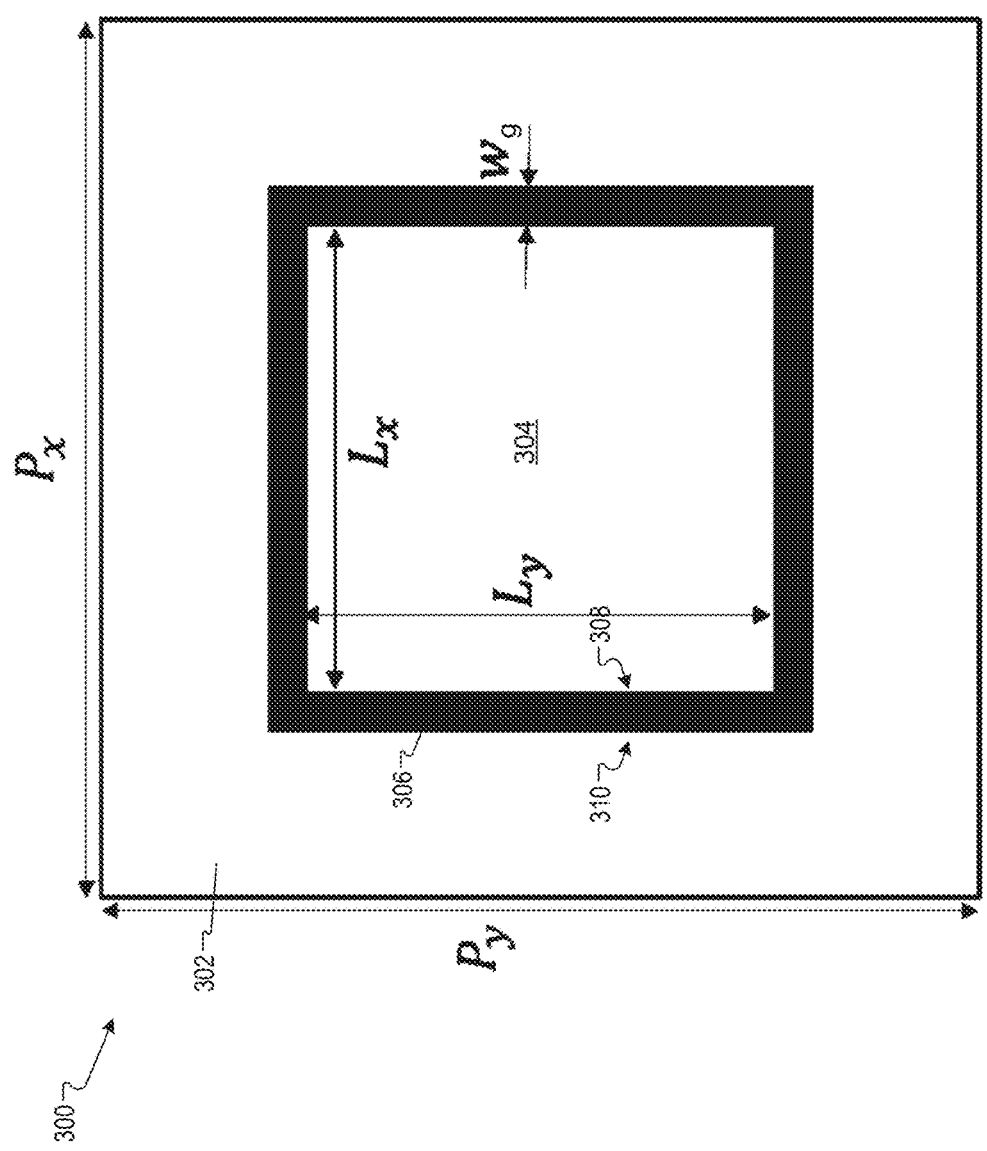
FIG. 3A illustrates a unit cell structure integrated into a film that includes a first frame and a second frame separated by a gap in the film, according to one implementation.

FIG. 3A illustrates a unit cell structure 300 (also referred to as a transparency window) resonant structure 304 separated from a frame 302 by a gap 306 in a film, according to one implementation. The frame 302 may be a first portion of the film and the resonant structure 304 may be a second portion of the film.

The frame 302 and the resonant structure 304 may be a conductive material and may be made of the film material. In one implementation, the gap 306 may form an island around the resonant structure 304 that entirely separates the frame 302 from the resonant structure 304. The gap may circumscribe the resonant structure 304 and the frame 302 may circumscribe the gap 306. For example, the first portion of the film may be a first square of the film that has a first size with a portion of the film removed from the center and the second portion of the film may be a second square of the film. The size of the second square may be smaller than the size of the first square by a defined amount and the second square may be located within the portion of the first square that has been removed. The gap 306 may be a gap between an outer perimeter 308 of the second square and an inner perimeter 310 of the first square.

The resonant structure 304 may be a patch of the conductive film that allows currents to move with an impinging electric field. The resonant structure of the second frame 204 may be formed by removing the conductive material at the gap 306 around the perimeter of the resonant structure 304 to form gap 306. The size of the resonant structure 304 may define a frequency of a signal that may pass through the resonant structure 304 in the conductive film. The width of the gap 306 impacts the transmission bandwidth of the signals that may be transmitted across the resonant structure 304 of the unit cell structure 300. In one implementation, as a width of the gap 306 decreases, a frequency band of signals that may be transmitted across the resonant structure 304 may decrease. In another implementation, as a width of the gap 306 increases, a frequency band of signals that may be transmitted across the resonant structure 304 may increase.

A size of the resonant structure 304 may define a center frequency of a radio signal that is allowed to transmit across the resonant structure 304 and a width of the first gap is associated with a bandwidth of a radio signal that is allowed to be transmitted across the conductive film.

Multiple resonant structures may be placed inside each other, with the larger resonant structures forming the frames of the smaller ones, as discussed below. Each resonant structure may be defined by the size of the conductive film inside a gap. The multiple frames may be concentrically layered (e.g., stacked inside each other) where gaps between each frame do not overlap with the outside of the next concentric frame, as discussed below.

In one implementation, the gap 306 may have a defined width ($W_g$) and area. The area of a gap may be the length of the gap multiplied by the height of the gap minus any area covered any structures or elements inside the gap, such as an inner frame or inner gap. The unit cell structure may be a resonant structure that controls a frequency or range of frequencies by transmitted across the film. The width and area of the resonant structure 304 may control what wavelengths of signals may be transmitted across the unit cell structure 300. The width and area of the resonant structure 304 may control what wavelengths of signals may be blocked by the unit cell structure 300. For example, when the unit cell structure 300 is part of a car windshield, it may be desirable to block wireless local area network (WLAN) frequencies from being leaving or entering the car to maintain a privacy of an individual in the car and reduce interference from outside WLAN signals. The individual may also desire to transmit and receive cellular signals or global positioning system (GPS) signals in and out of the car to communicate with other devices. The cellular signals may be between signals with frequencies between 800 megahertz (MHz) and 940 MHz, 1700 MHz-2000 MHz, or 2100 MHz-2200 MHz. The GPS signals may be signals with frequencies of approximately 1227.60 MHz or 1575 MHz.

In this example, the size of the resonant structure 304 and the width of the gap 306 may be adjusted to allow the cellular signals or the GPS signals to be transmitted through the resonant structure 304 structure 300 while blocking the WLAN signals.

In one implementation, the size of the resonant structure 304 may be ⅐ to ⅛ the size of the free space wavelength of a defined signal that is to be transmitted across the unit cell structure 300. For example, a signal with a frequency of 1.9 gigahertz (GHz) may have a wavelength that is approximately 157 millimeters (mm) in length, where ⅛ of 157 mm is approximately 19.6 mm. To allow the 1.9 GHz signal to travel across the unit cell structure 300, a border of the frame 302 may be 40 millimeters (mm) in width ($P_x$) and 40 mm in length ($P_y$). A border of the resonant structure 304 may be 19.6 mm in width ($L_x$) and 19.6 mm in length ($L_y$). The width of the gap ($W_g$) may be between 1.0 mm and 2.6 mm. When $W_g$ is 1 mm the area of the gap may be (20.6 mm*20.6 mm)-(19.6 mm*19.6 mm)=40.2 mm. When $W_g$ is 2.6 mm the area of the gap may be (22.2 mm*22.2 mm)-(19.6 mm*19.6 mm)=108.68 mm.

In one example, the unit cell structure 300 may be linearly scaled from allowing a signal at a first frequency (f1) to be transmitted across the unit cell structure 300 to allowing a signal at a second frequency (f2) to be transmitted across the unit cell structure 300. For example, the dimensions (L2) of a new unit cell structure may be determined using the following formula L2=f1/f2*L1, where L1 is the linear dimensions of the current unit cell structure 300, f1 is the frequency of the signal that is currently being transmitted across the current unit cell structure 300, and f2 is the new frequency of the signal that is to be transmitted across the new unit cell structure. Additionally, a width of the gap may be codependent with a resonance of the frame. In another implementation, the resonant structure 304 the frequency may range from 0.1 to 100 GHz, which may correlate to resonant structure ranging from 0.1 mm to 400 mm.

Figure 3B:
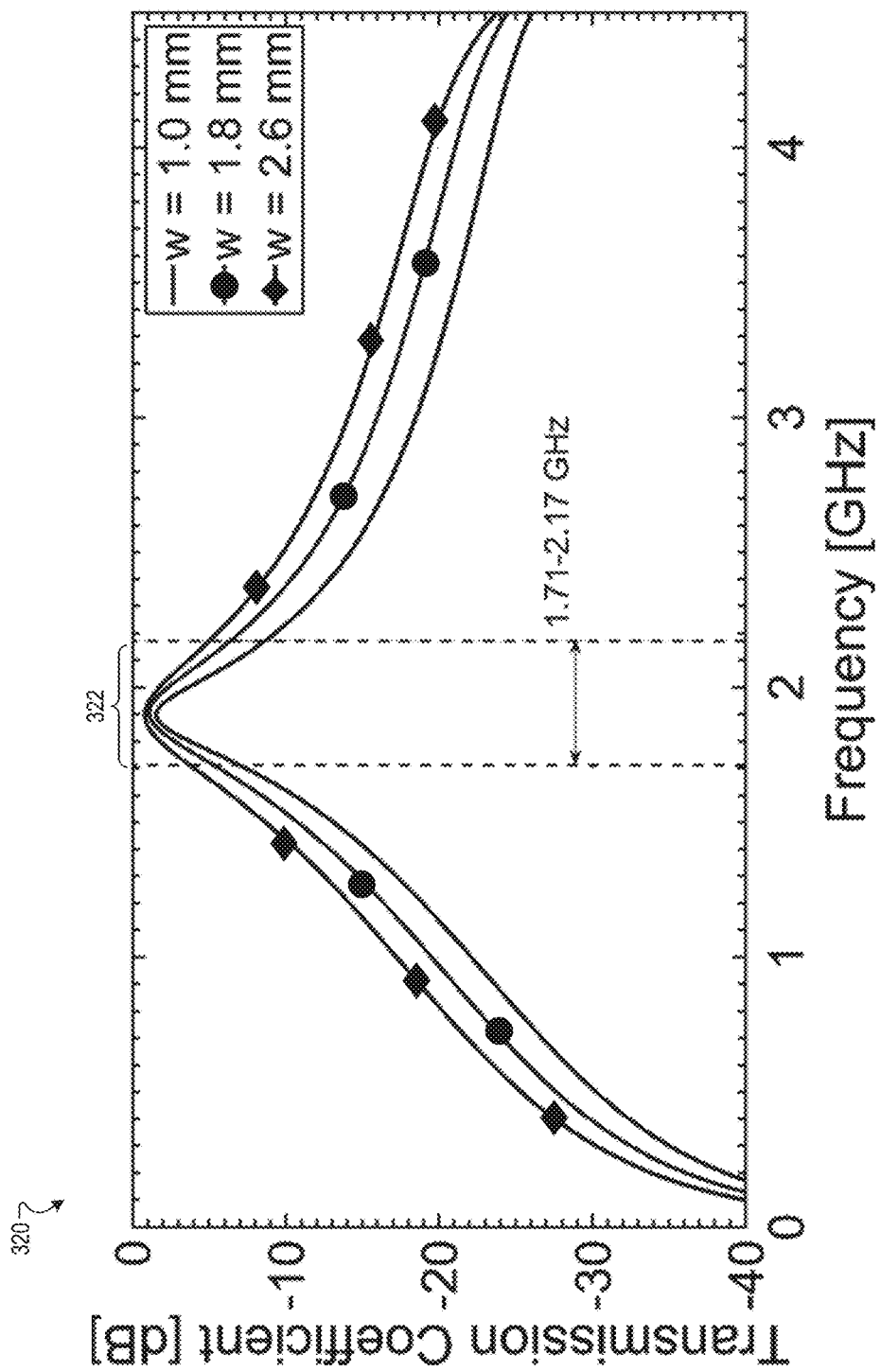
FIG. 3B illustrates a transmission spectrum graph for the unit cell structure in FIG. 3A with different width values for the gap, according to one implementation.

FIG. 3B illustrates a transmission spectrum graph 320 for the unit cell structure 300 in FIG. 3A with different width values for the gap 306, according to one implementation. As discussed above, as the width value of the gap 306 varies, the transmission bandwidth for the frequencies that may be sent and received across the unit cell structure 300 may also vary. In one example, as the width value of the gap 306 increases, the transmission bandwidth for the frequencies may also increase. In another example, as the width value of the gap 306 decrease, the transmission bandwidth for the frequencies may also decrease. Additionally, characteristics of the support layers may change the frequency range and bandwidth that may be transmitted across the unit cell structure 300. The characteristics of a support layer may include: the type of material of a support layer (such as glass, plastic, or plexiglass), the thickness of the support layer, materials impregnated in the support layer, the dielectric properties of the support layer, a (frequency dependent) loss coefficient of the support layer, support layer support layer and so forth.

The resonance structure 304 may be linearly scaled to adjust the range of the frequency window 322 for the varying characteristics of the support layers. For example, a signal that is 0 dB+/−3 dB may be transmitted across the gap 306. In one implementation, a width of the gap 306 may initially be 1.8 mm. The 1.8 mm width may allow a signal in a frequency range of 1.85 GHz-2.12 GHz to be transmitted across the gap and the support layer. When the desired frequency window 322 of a signal that may be transmitted across the resonant structure 304 and the support layer is 1.71 GHz-2.17 GHz, a width of the gap may be adjusted to increase the frequency window 322. For example, for a given set of characteristics for the support layer, decreasing a width of the gap 306 to 1.0 mm may decrease the frequency window 322 to 1.9 GHz-2.1 GHz and increasing a width the gap 306 to 2.6 mm may increase the frequency window 322 to 1.71 GHz-2.17 GHz. In this example, the gap 306 may be increased to 2.6 mm to enable the frequency window 322 to include the desired range of frequencies.

Figure 4:
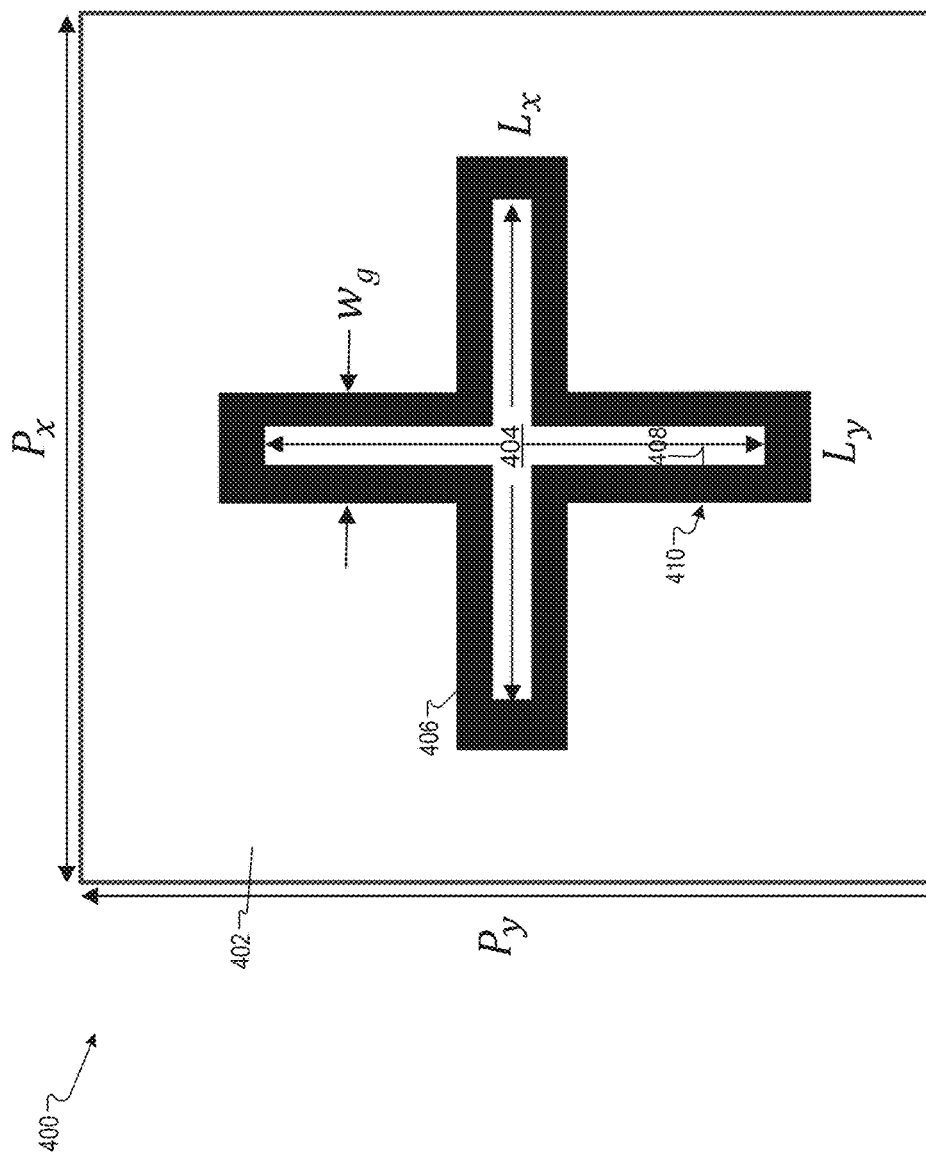
FIG. 4 illustrates a unit cell structure integrated into a film that includes a first frame and a second frame separated by a cross-shaped gap in the film, according to one implementation.

FIG. 4 illustrates a unit cell structure 400 with a resonant structure 404 separated from a frame 402 by a cross-shaped gap 406 in a film, according to one implementation. The frame 402 may be a first portion of the film and the resonant structure 404 may be a second portion of the film.

The gap 406 may form an island around the resonant structure 404 that entirely separates the frame 402 from the resonant structure 404. The resonant structure 404 may be shaped as a cross and the gap 406 may circumscribe the cross-shaped resonant structure 404. The gap 406 may be a gap between an outer perimeter 408 of the resonant structure 404 and an inner perimeter 410 of the frame 402.

In one implementation, the gap 406 may have a defined width ($W_g$) and area. The area of a gap may be the length of the gap multiplied by the height of the gap minus any area covered any structures or elements inside the gap, such as an inner frame or inner gap. A border of the resonant structure 404 may have a width ($L_x$) and a length ($L_y$). In one implementation, $L_x$ and $L_y$ may be the same. In another implementation, $L_x$ and $L_y$ may be different. The unit cell structure 400 may be a resonant structure that controls a frequency or range of frequencies by transmitted across the film. The width and area of the resonant structure 404 may control what wavelengths of signals may be transmitted across the unit cell structure 400. The width and area of the resonant structure 404 may control what wavelengths of signals may be blocked by the unit cell structure 400.

Figure 5:
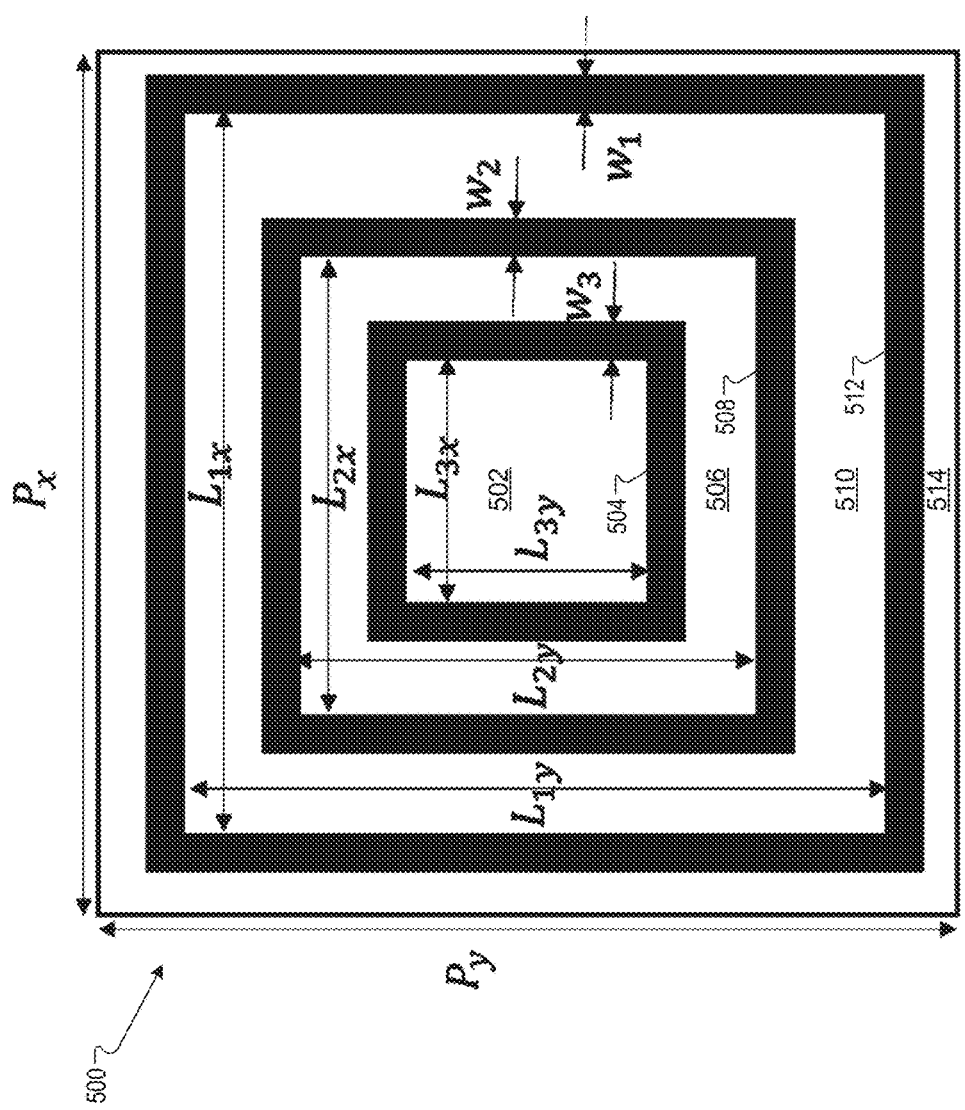
FIG. 5 illustrates a unit cell structure of the film that includes a first resonant structure, a first gap, a second resonant structure, which also form the frame around first resonant structure, a second gap, a third resonant structure, which also form the frame around the second resonant structure, a third gap, and an outer frame, according to one implementation.

FIG. 5 illustrates a unit cell structure 500 of the film that includes a first resonant structure 502, a first gap 504, a second resonant structure 506, which also form the frame around first resonant structure 502, a second gap 508, a third resonant structure 510, which also form the frame around the second resonant structure 506, a third gap 512, and an outer frame 514, according to one implementation. The first resonant structure 502, the second resonant structure 506, and the third resonant structure 510 may be made of the film material.

The unit cell structure 500 may include resonant structures 502, 506, and 510 with different sizes to allow signals at different frequencies to be transmitted across the film. The area of a gap frame may be the length of the gap frame multiplied by the height of the gap frame minus any area covered any structures or elements inside the gap, such as an inner frame or inner gap.

The resonant structure 502 may be integrated into the unit cell structure 500 where the first resonant structure 502 is placed in the center of the unit cell structure 500 and the first gap 504 may be located along a periphery of the first frame. The first resonant structure may have the smallest length and height dimensions of the resonant structures 502, 506, and 510. The progressively larger frames and gaps may be located along the periphery of the first gap 504 such that the gaps 504, 508, 512 that separate each resonant structure 502, 506, 510 from its surrounding frame 506, 510, 514 form a concentric arrangement. For example, the second frame 506 may be located along a periphery of the first gap 504, the second gap 508 may be located along a periphery of the second frame 506, the third frame 510 may be located along a periphery of the second gap 508, and the third gap 512 may be located along a periphery of the third frame 510.

The first resonant structure 502 may be 9.4 mm in length by 9.4 mm in height. The first gap 504 may be 0.4 mm wide. The second resonant structure 506 may be 19.5 mm in length by 19.5 mm in height. The second gap 508 may be 0.9 mm wide. The third resonant structure 510 may be 37.5 mm in length by 37.5 mm in height. The third gap is 0.9 mm wide. The outer frame 514 may be 40 mm in length by 40 mm in height.

The first resonant structure 502 may be sized to allow a signal at approximately 0.825 GHz to be transmitted across the first unit cell 500. The second resonant structure 506 may be sized to allow a signal at approximately 1.84 GHz to be transmitted across the second unit cell 500. The third resonant structure 510 may be sized to allow a signal at approximately 3.6 GHz to be transmitted across the third unit cell 500.

Figure 6:
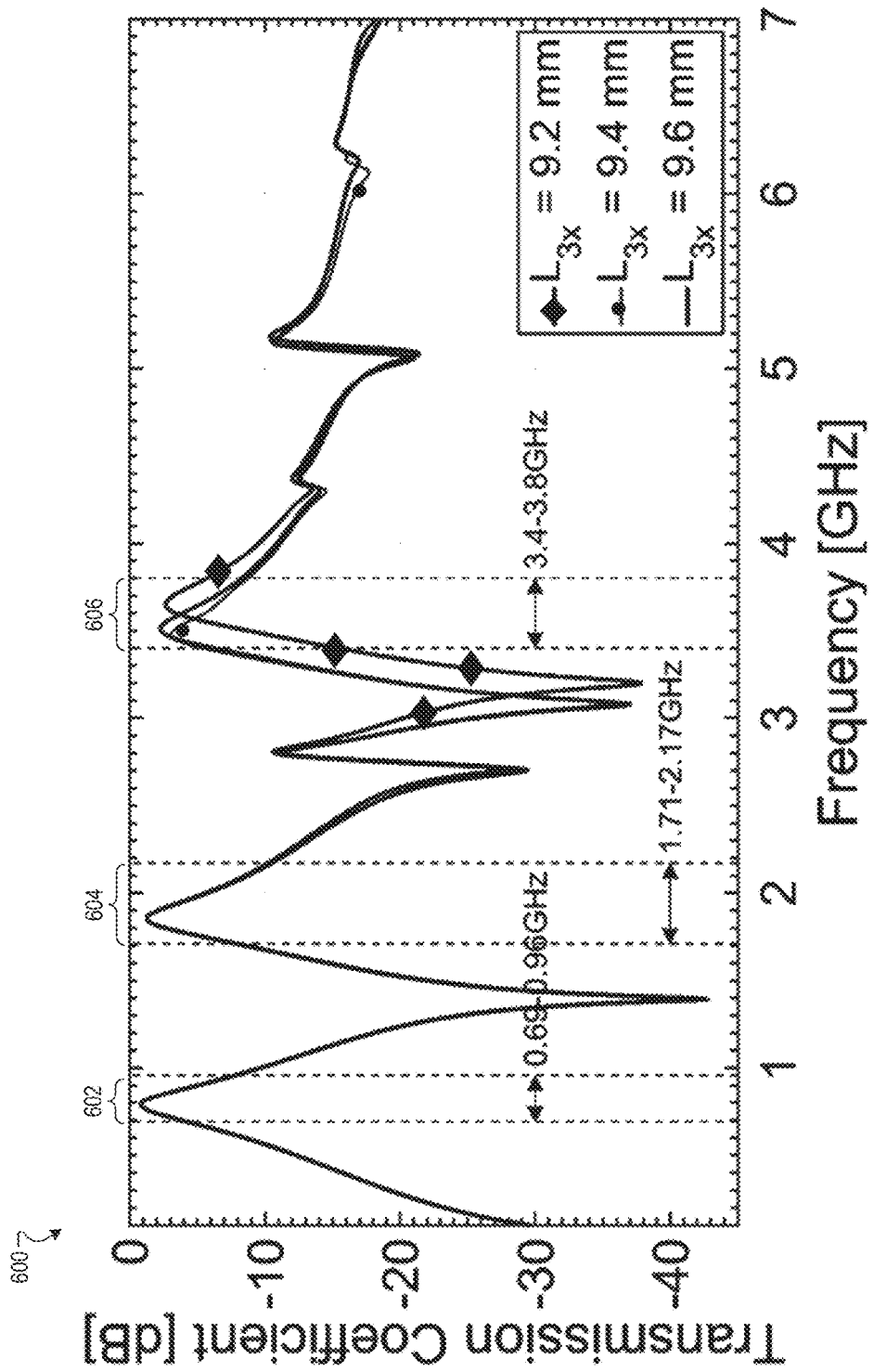
FIG. 6 illustrates a transmission spectrum graph for the unit cell structure in FIG. 5 with a first frequency window, a second frequency window, and a third frequency window, according to one implementation.

FIG. 6 illustrates a transmission spectrum graph 600 for the unit cell structure 500 in FIG. 5 with a first frequency window 602, a second frequency window 604, and a third frequency window 606, according to one implementation. The first frequency window 602 may have a frequency range between 0.69 GHz-0.96 GHz. The first frequency window 602 may be associated with the third resonant structure 510. The second frequency window 604 may have a frequency range between 1.71 GHz-2.17 GHz. The second frequency window 604 may be associated with the second resonant structure 506. The third frequency window 606 may have a frequency range between 3.4 GHz-3.8 GHz. The third frequency window 606 may be associated with the first resonant structure 502.

As discussed above, the width of the frequency bands corresponding to the frequency windows 602, 604, 606 may be adjusted by varying the width of the gaps 512, 508, 504, respectively to include a desired frequency range. For example, when the width of the third gap 512 is 9.2 mm, the range of frequencies that may be transmitted across the film is 0.69 GHz-0.96 GHz. When the width and length of the third gap 512 are 9.4 mm, the range of frequencies that may be transmitted across the film is 3.8 GHz-3.9 GHz. When the width and length of the third resonant structure 512 are 9.6 mm, the range of frequencies that may be transmitted across the film is 3.6 GHz-3.7 GHz.

Figure 7:
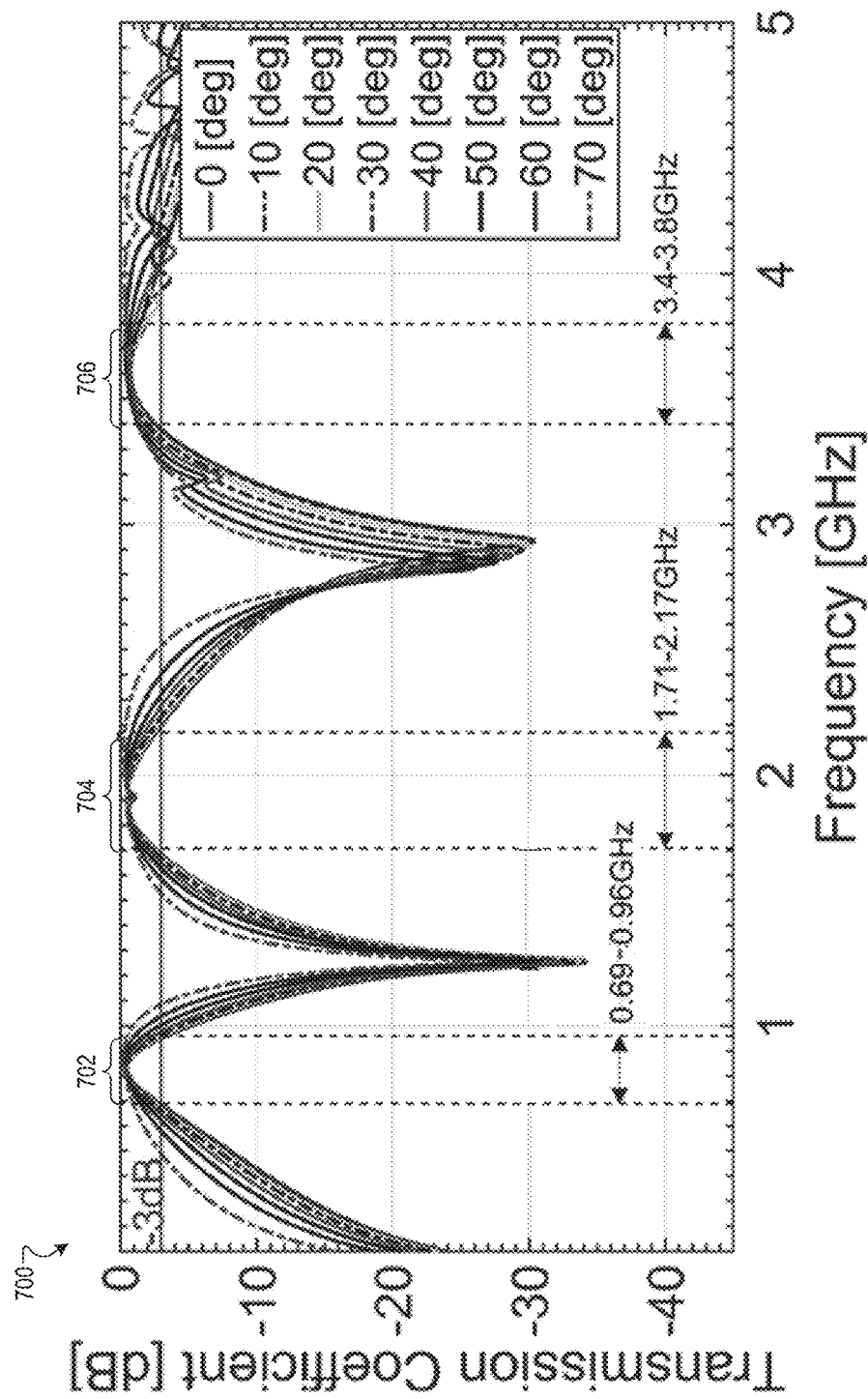
FIG. 7 illustrates a transmission spectrum graph with signals transmitted at different incident angles, according to one embodiment.

FIG. 7 illustrates a transmission spectrum graph 700 with signals transmitted at different incident angles, according to one embodiment. The resonant structure 304 of the unit cell structure 300 in FIG. 3A and the resonant structures 502, 506, and 510 of the unit cell structure 500 in FIG. 5 may allow for signals at the defined frequencies to be transmitted across the film at different incident angles and have substantially the same transmission coefficient, i.e. the transmitted power of the signal at the frequency band allowed to transmit through the film may vary as a function of incident angle.

Figure 8:
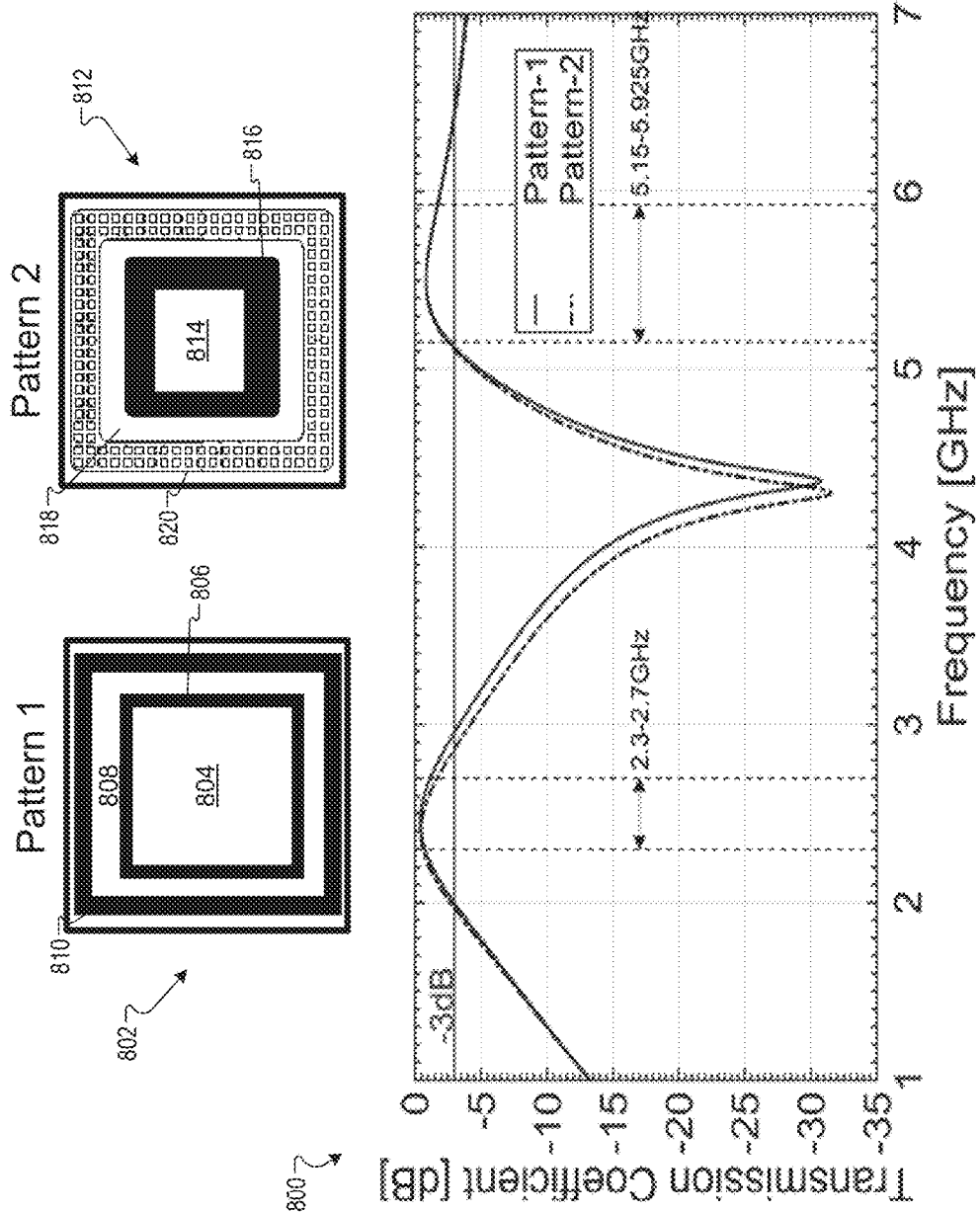
FIG. 8 illustrates a transmission spectrum graph for signals transmitted across a first unit cell structure and a second unit cell structure, according to one embodiment.

FIG. 8 illustrates a transmission spectrum graph 800 for signals transmitted across a first unit cell structure 802 and a second unit cell structure 830, according to one embodiment. The shape and form of a unit cell structure may be modified with minimal effects on a frequency range of signals that may be transmitted across a film.

The first unit cell structure 802 may include a first resonant structure 804, a first gap 806, a second resonant structure 808, a second gap 810 and an second unit cell structure 812 that make up the first pattern. The first resonant structure 804 may be located in the center of the first unit cell structure 802. The second resonant structure 808 may have a square shape with square corners. The first gap 806 may have straight boundaries that connect with square corners. The second resonant structure 808 may have a square shape with square corners. The second gap 810 may have straight boundaries that connect with square corners.

The second unit cell structure 812 may include a first resonant structure 814, a first gap 816, a second resonant structure 818, a second gap 820 and an outer frame 832 that make up the second pattern. The first resonant structure 814 may be located in the center of the second unit cell structure 812. The second resonant structure 818 may have a square shape with rounded corners. The first gap 816 may have straight boundaries that connect with rounded corners. The second resonant structure 818 may have a square shape with rounded corners. The second gap 810 may have straight boundaries that connect with rounded corners.

In one implementation, the second gap 820 between the resonant structures and the frames surrounding it (as shown for gap 820 of structure 812) may be filled with many small non-connected patches or islands of conductive material. The advantage of adding these small disconnected islands of film or conductive material inside the gap regions of the unit cell structures is to have more of the surface area of the unit cell covered by the film without reducing the ability of the unit cell to allow the transmission of frequency band(s) as determined by the size of the resonant structure(s) and width of the gap(s). In another implementation, the second gap 820 may include multiple islands of film located within the gap window 820. In one implementation, an island of the film is a relatively small piece of film surrounded by empty space or another material.

The cutouts or islands may fill in a portion of the second gap 820, such as 50-80 percent of the second gap 820, with the film. In one example, a size of cutouts or islands may be approximately $\frac{1}{10}^{th}$ the length of a desired wavelength of the signal to be transmitted through the second gap 820.

The transmission spectrum graph 800 shows a transmission coefficient of the first unit cell structure 802 and the second unit cell structure 812 for a frequency range between 1 GHz-7 GHz. The transmission spectrum graph 800 shows that the first unit cell structure 802 and the second unit cell structure 812 may have substantially the same transmission coefficient over the 1-7 GHz frequency range.

Figure 9A:
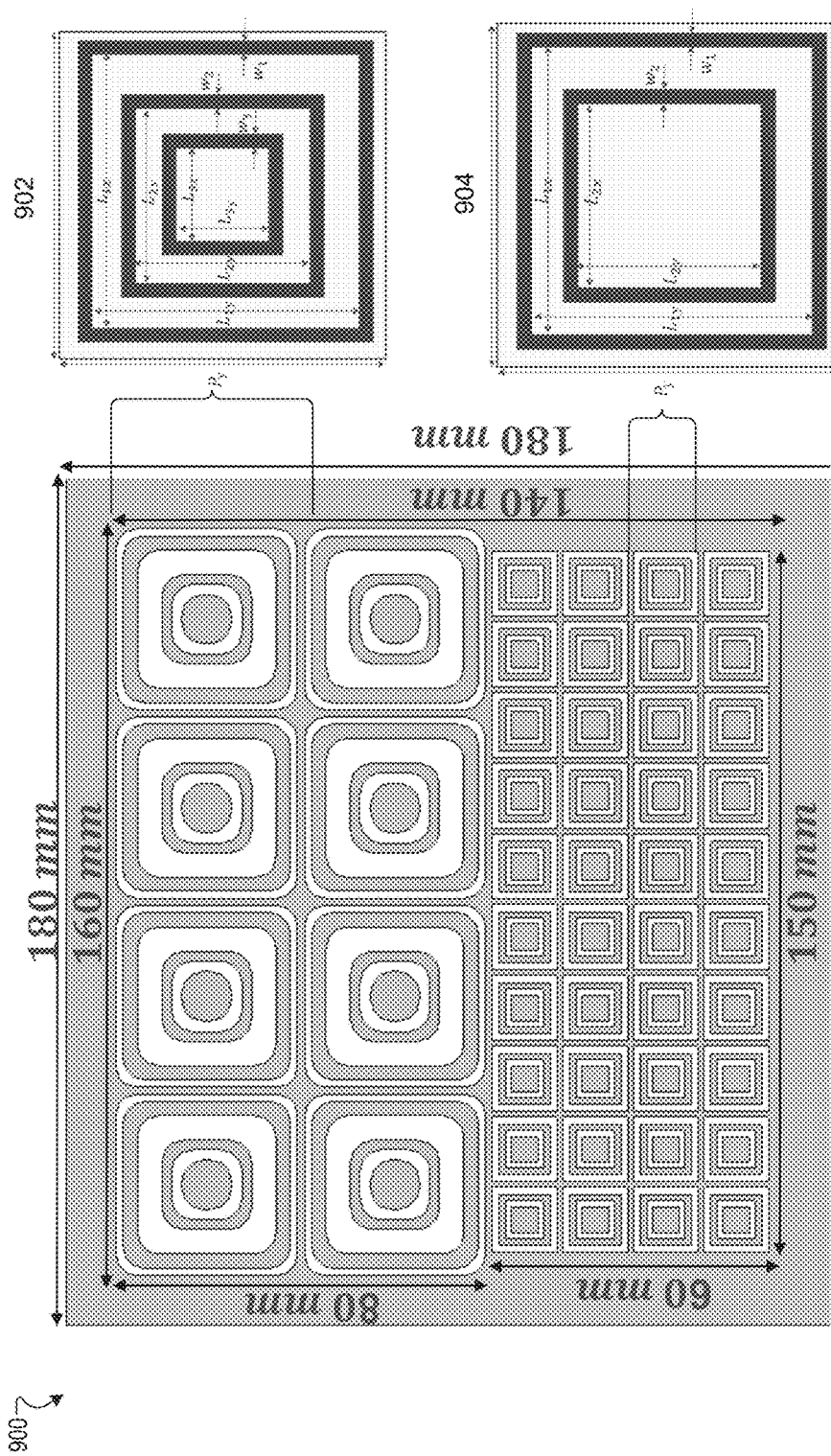
FIG. 9A shows cell array structure with a first sub-unit cell array and a second sub-unit cell array, according to one embodiment.

FIG. 9A shows cell array structure 900 with a first sub-unit cell array 902 and a second sub-unit cell array 904, according to one embodiment. A window of a vehicle, building, or other structure may include a defined area where the unit cell structure 900 may be located. In one example, a car window may include a defined area for the unit cell structure 900 that does not hinder visibility by a driver and allows the transmission of a signal across the film at the defined area. A minimum size of the defined area may be restricted by the size of a frame and gap needed to allow the transmission of a signal at a defined frequency across the film. For example, the defined area for a car windshield may be 180 mm in length and 180 mm in height. The unit cell structure 900 may cover at least a portion of the defined area. A maximum size of the defined area may be restricted by a size of a support layer the unit cell structure 900 may connect or adhere. In one example, the maximum area may be a portion of a car windshield that does not block visibility and not be the entire area of the windshield.

When the defined frequency ranges that are to be transmitted across the unit cell structure 900 are too close together in frequency so that their resonant structures overlap (i.e. the inner resonant structure of one lies inside the gap of the another structure) the unit cell structure 900 may include multiple sub-unit cell structure. In one example, the frequency ranges may be too close together when the frequency ranges are 9 MHz apart.

In one implementation, the first sub-unit cell structure 902 may cover a first portion of the defined area and the second sub-unit cell structure 904 may cover a second portion of the defined area. In one example, the first area may be 160 mm in length and 80 mm in height.

The first sub-unit cell structure 902 may include resonant structures and gaps in a first pattern to allow signals within a first set of frequency ranges be transmitted across the first sub-unit cell structure 902. The size of the resonant structures of the first sub-unit cell structure 902 may include 9.4 mm×9.4 mm, 19.5 mm×19.5 mm, and 37.5 mm×37.5 mm, going from the inner resonant structure to the outer resonant structure. The width of the gap of the first sub-unit cell structure 902 may include 0.9 mm, 0.9 mm, and 0.4 mm, going from the inner gap to the outer gap. In one implementation, the first set of frequency ranges may include 690 MHz-960 MHz, 1.71-2.17 GHz, and 3.4-3.8 GHz.

The second sub-unit cell structure 904 may include resonant structure and gaps in a second pattern to allow signals within a second set of frequency ranges be transmitted across the second sub-unit cell structure 904. The size of the resonant structure of the second sub-unit cell structure 904 may include 6.5 mm×6.5 mm and 12 mm×12 mm, going from the inner resonant structure to the outer resonant structure. The width of the gaps of the second sub-unit cell structure 904 may include 0.5 mm and 0.4 mm-0.6 mm, going from the inner gap to the outer gap. In one implementation, the second set of frequency ranges may include 2.3-2.7 GHz and 5.15-5.925 GHz.

The number of sub-unit cell structures or the frequency ranges covered by the sub-unit cell structures is not intended to be limiting. In one example, the unit cell structure 900 may include a mixture of sub-unit cell structures in a homogeneous distribution. In another example, the defined area may be covered by multiple sub-unit cell structures, each at different locations within the defined area.

Figure 9B:
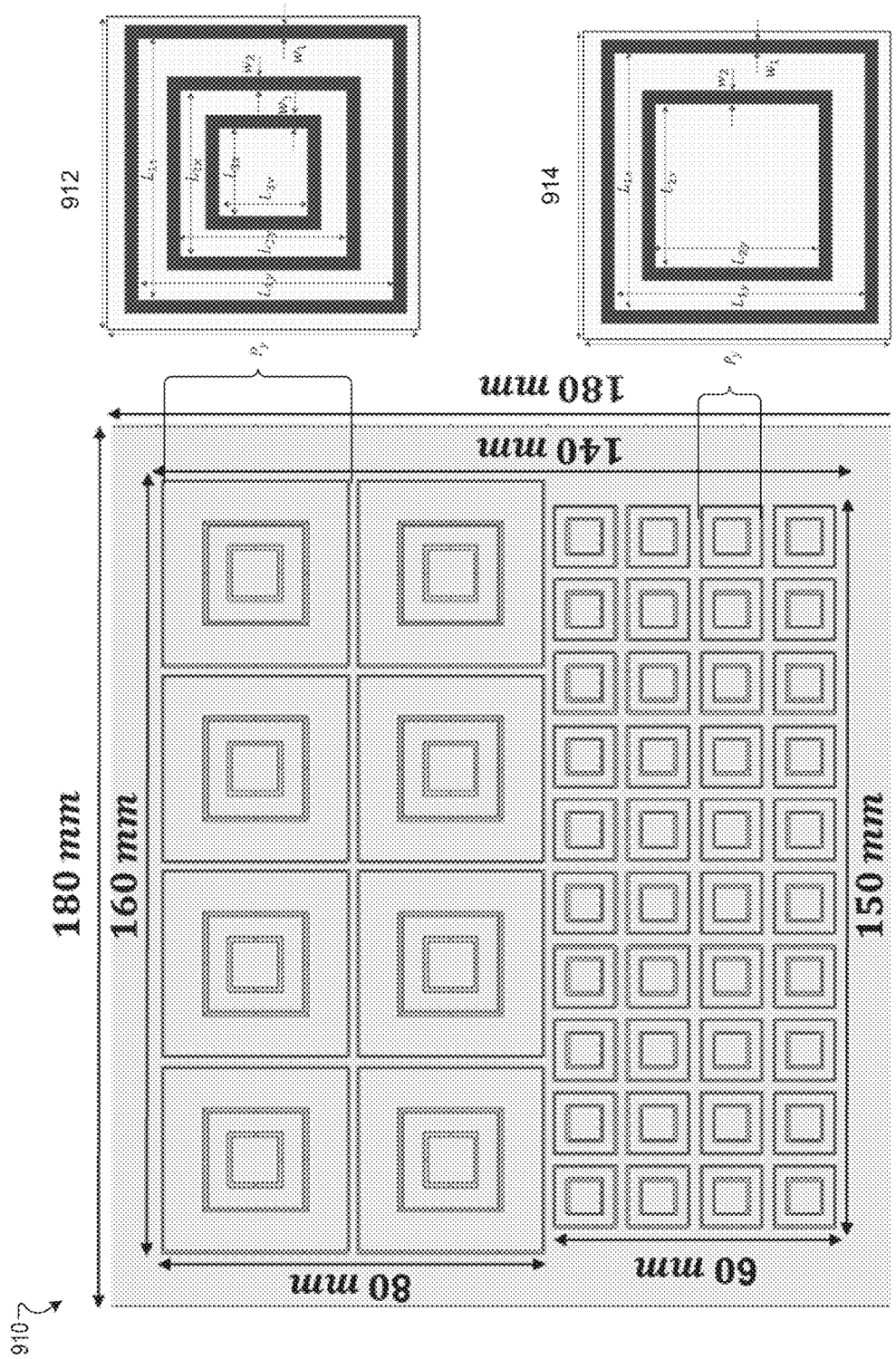
FIG. 9B shows cell array structure 910 with a first sub-unit cell array and a second sub-unit cell array, according to one embodiment.

FIG. 9B shows cell array structure 910 with a first sub-unit cell array 912 and a second sub-unit cell array 914, according to one embodiment. In one implementation, the first sub-unit cell structure 912 may cover a first portion of the defined area and the second sub-unit cell structure 914 may cover a second portion of the defined area. In one example, the first area may be 160 mm in length and 80 mm in height.

The first sub-unit cell structure 912 may include resonant structures and gaps in a first pattern to allow signals within a first set of frequency ranges be transmitted across the first sub-unit cell structure 912. The size of the resonant structures of the first sub-unit cell structure 912 may include 9.08 mm×9.08 mm, 18.38 mm×18.38 mm, and 35.83 mm×35.83 mm, going from the inner resonant structure to the outer resonant structure. The width of the gap of the first sub-unit cell structure 912 may include 2.23 mm, 4.06 mm, and 0.94 mm, going from the inner gap to the outer gap. In one implementation, the first set of frequency ranges may include 690 MHz-960 MHz, 1.71-2.17 GHz, and 3.4-3.8 GHz.

The second sub-unit cell structure 914 may include resonant structures and gaps in a second pattern to allow signals within a second set of frequency ranges be transmitted across the second sub-unit cell structure 914. The size of the resonant structure of the second sub-unit cell structure 914 may include 6.307 mm×6.307 mm and 12 mm×12 mm, going from the inner resonant structure to the outer resonant structure. The width of the gaps of the second sub-unit cell structure 914 may include 0.504 mm and 0.5 mm, going from the inner gap to the outer gap. In one implementation, the second set of frequency ranges may include 2.3-2.7 GHz and 5.15-5.925 GHz.

The number of sub-unit cell structures or the frequency ranges covered by the sub-unit cell structures is not intended to be limiting. In one example, the unit cell structure 910 may include a mixture of sub-unit cell structures in a homogeneous distribution. In another example, the defined area may be covered by multiple sub-unit cell structures, each at different locations within the defined area.

Figure 10:
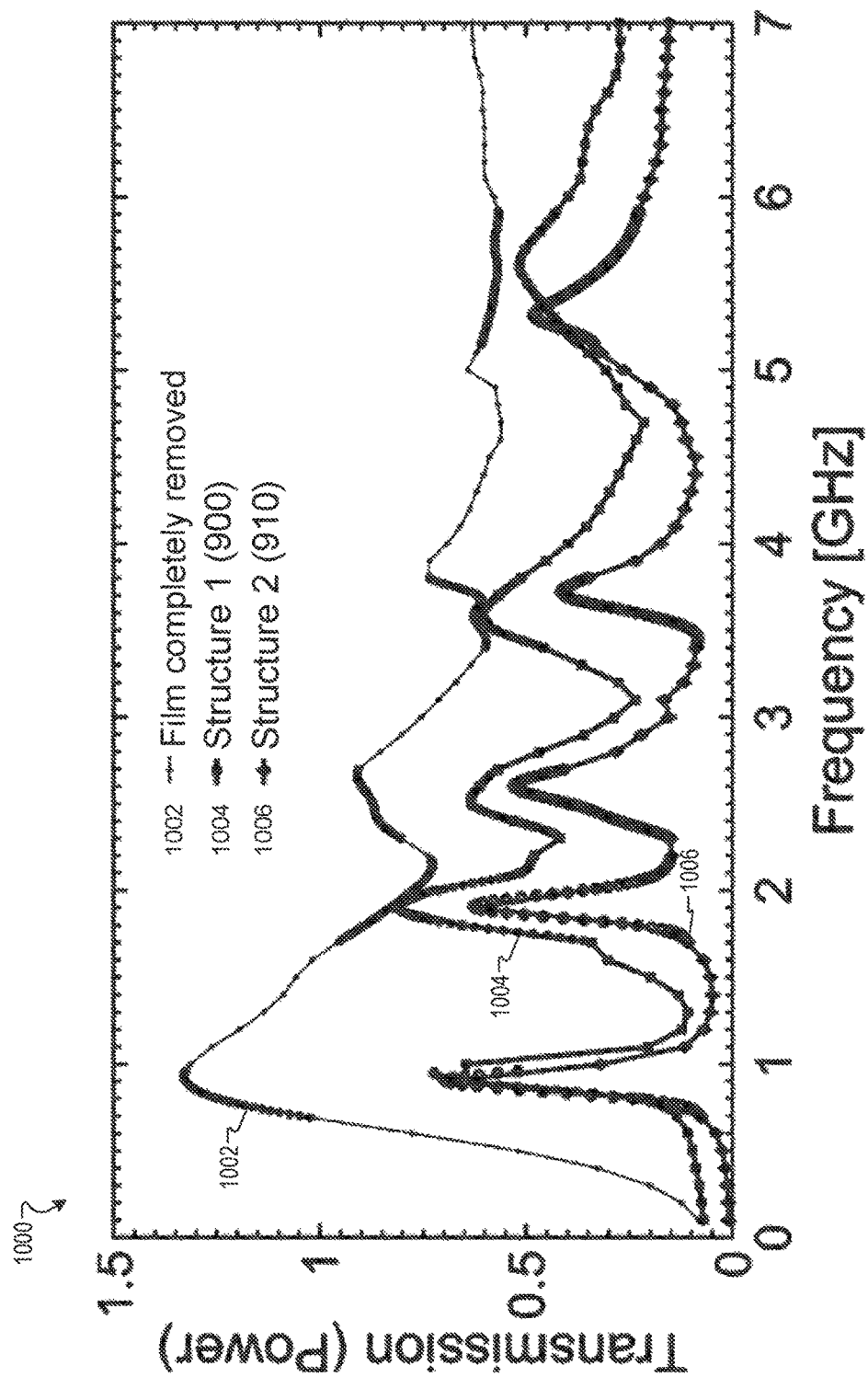
FIG. 10 illustrates a transmission spectrum graph for a first signal transmitted across a transparency layer without the film, a second signal transmitted across a cell array structure in FIG. 9A, and a third signal transmitted across a cell array structure in FIG. 9B, according to one embodiment.

FIG. 10 illustrates a transmission spectrum graph 1000 for a first signal 1002 transmitted across a transparency layer without the film, a second signal 1004 transmitted across a cell array structure 900 in FIG. 9A, and a third signal 1006 transmitted across a cell array structure 910 in FIG. 9B, according to one embodiment. In one example, the transparency layer with the cell array structure 900 or the cell array structure 910 may be an area of film that is 14 cm by 16 cm.

The transmission spectrum graph 1000 shows an amount of power (dB) transmitted for the first signal 1002, the second signal 1004, and the third signal 1006 that is transferred across a unit cell structure. The first signal 1002 corresponds to an area where the film has been completely removed and the frequencies with wavelengths that may be smaller than approximately 2 times the size of the area where the film has been may be allowed to pass through the film. However, removing all of the film from an area may void the intended functionality of the film, such as to block signals at selected frequencies from being transmitted across the film and reflect IR light. For the area where the film has been completely removed, the power of the first signal 1002 between 1-7 GHz may range between 1 dB-1.45 dB. For the cell array structure 900 (FIG. 9A) with unit cell structure 902, the power of the second signal 1004 between 1-7 GHz may range between 0.1 dB-0.8 dB. For the cell array structure 910 (FIG. 9B) with unit cell structure 912, the power of the third signal 1006 between 1-7 GHz may range between 0.1 dB-0.6 dB. For unit cell structures 902 and 912, 5 select frequency bands may be allowed to pass through the film, with curve 1004 corresponding to a better-optimized structure of the unit cells, allowing for higher power and wider bandwidth transmission at the selected frequency ranges.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

The terms "over," "above" "under," "between," and "on" as used herein refer to a relative position of one material layer or component with respect to other layers or components. For example, one layer disposed above or over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening layers. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into many other different systems of applications. Various presently unforeseen or unanticipated alternatives, modifications, variations, or improvements therein may be subsequently made by those skilled in the art which are also intended to be encompassed by the following claims.

What is claimed is:

1. An apparatus comprising:
    a conductive film comprising:
    a first portion of the conductive film that is a resonant structure, wherein the first portion is continuous and substantially shaped like an island; and
    a second portion of the conductive film circumscribing the first portion, wherein the second portion is continuous and substantially shaped like a frame circumscribing the first portion, wherein the second portion is separated from the first portion by a first non-conducting, continuous gap along a periphery of the first portion of the conductive film;
wherein a size of the first portion determines a center frequency of a first passing band, wherein a radio signal within the passing band is allowed to transmit across the conductive film, wherein a width of the first gap determines a bandwidth of the first passing band, and wherein a 3 dB bandwidth of the first passing band is less than 1 GHz.

2. The apparatus of claim 1, wherein the conductive film further comprises a third portion of the conductive film circumscribing the second portion, wherein the third portion is separated from the second portion by a second gap along a periphery of the second portion of the conductive film and wherein a size of the second portion determines a second passing band.

3. The apparatus of claim 1, wherein a radio signal within the first passing band comprises a cellular communications signal between 800 megahertz (MHz) and 940MHz, 1700MHz-2000MHz, or 2100MHz-2200MHz.

4. The apparatus of claim 1, further comprising a first support layer to connect to the conductive film.

5. The apparatus of claim 4, wherein the support layer comprises at least one of a glass material, a plastic material, a polymethyl methacrylate material, or an acrylic material.

6. The apparatus of claim 1, further comprising:
a first support layer to connect to a first side of the conductive film;
an interlayer to connect to a second side of the conductive film; and
a second support layer to connect to the interlayer.

7. The apparatus of claim 1, wherein the conductive film is applied to a window of a vehicle, a window of a building, a window in an aircraft, or a visor in a helmet.

8. The apparatus of claim 1, wherein the size of the first portion and a width of the first gap collectively determines a center frequency of a first blocking band, and wherein a radio signal within the blocking band is blocked by the conductive film.

9. The apparatus of claim 1, wherein the conductive film comprise at least one of a conductive material, a metallic material, a metal alloy material, or a ceramic material.

10. The apparatus of claim 1, wherein the first gap is filled with one or more conductive islands, wherein each of the one or more islands is substantially smaller than a wavelength of the first radio signal.

11. The apparatus of claim 1, further comprising:
a third portion of the conductive film at a second location of the conductive film, wherein the third portion of the conductive film is a second resonant structure; and
a fourth portion of the conductive film circumscribing the third portion, wherein the fourth portion is separated from the third portion by a second gap along a periphery of the third portion of the conductive film, wherein a size of the third portion determines a center frequency of a second passing band, wherein a radio signal within the second passing band is allowed to transmit across the conductive film at the second location and wherein a width of the second gap determines a bandwidth of the second passing band.

12. The apparatus of claim 1, wherein the first portion, the second portion, and the gap form the resonant structure that is repeated in the conductive film to form an array of resonant structures.

13. An apparatus comprising:
a conductive film to block at least a portion of infrared light, the conductive film comprising:
a first portion of the conductive film at a first location of the conductive film, wherein the first portion of the conductive film is a first resonant structure, wherein the first portion is continuous and substantially shaped like an island;
a second portion of the conductive film circumscribing the first portion, wherein the second portion is continuous and substantially shaped like a frame circumscribing the first portion, wherein the second portion is separated from the first portion by a first non-conducting, continuous gap along a periphery of the first portion of the conductive film,
wherein a size of the first portion determines a center frequency of a first passing band, wherein a radio signal within the first passing band is allowed to transmit through the conductive film, width of the first gap determines a bandwidth of the first passing band, and wherein a 3 dB bandwidth of the first passing band is less than 1 GHz;
a third portion of the conductive film at a second location of the conductive film, wherein the third portion of the conductive film is a second resonant structure; and
a fourth portion of the conductive film circumscribing the third portion, wherein the fourth portion is continuous separated from the third portion by a second gap along a periphery of the third portion of the conductive film, wherein a size of the third portion determines a center frequency of a second passing band, wherein a radio signal within the second passing band is allowed to transmit across the conductive film at the second location, wherein a width of the second gap determines a bandwidth of the second passing band, and wherein a 3 dB bandwidth of the second passing band is less than 1 GHz.

14. The apparatus of claim 13, wherein the radio signal within the first passing band is transmitted across the first gap of the conductive film at a first incident angle or a second incident angle, wherein the first incident angle and the second incident angle are different angles.

15. The apparatus of claim 13, wherein:
a wavelength of the radio signal within the first passing band is approximately 157 millimeters (mm) in length;
the first gap is approximately 18mm wide;
a border of the first portion is approximately 19.6mm in width and 19.6mm in length; and
a border of the second portion is approximately 40mm in width and 40mm in length.

16. The apparatus of claim 13, wherein the first gap includes a fifth portion of the conductive film that fills a portion of the first gap.

17. An apparatus comprising:
a first support layer;
a second support layer; and
a conductive film laminated between the first support layer and the second support layer, the conductive film to block at least a portion of a spectrum of light, the conductive film comprising:
a first portion of the conductive film, wherein the first portion is continuous and substantially shaped like an island; and
a second portion of the conductive film circumscribing the first portion, wherein the second portion is continuous and substantially shaped like a frame circumscribing the first portion, wherein the second portion is separated from the first portion by a first non-conducting, continuous gap along a periphery of the first portion of the conductive film, wherein a size of the first portion determines a center frequency of a first passing band, wherein a radio signal that-within the first passing band is allowed to transmit across the conductive film, wherein a width of the first gap determines a bandwidth of the first passing band, and wherein a 3 dB bandwidth of the first passing band is less than 1 GHz.

18. The apparatus of claim 17, wherein the first portion of the conductive film and the second portion of the conductive film are located within a defined area of the conductive film, and wherein the defined area is smaller than an entire area of the conductive film.

19. The apparatus of claim 17, wherein the conductive film is substantially transparent to reflect infrared light and allow visible light to transmit through the conductive film.

20. The apparatus of claim 17, wherein the conductive film is impregnated with metal material or metal alloy material.

* * * * *